(12) United States Patent
Horng et al.

(10) Patent No.: US 10,415,818 B2
(45) Date of Patent: Sep. 17, 2019

(54) VENTILATOR WITH A LIGHT-EMITTING DEVICE

(71) Applicant: Sunonwealth Electric Machine Industry Co., Ltd., Kaohsiung (TW)

(72) Inventors: Alex Horng, Kaohsiung (TW); Tsun-Chung Teng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 261 days.

(21) Appl. No.: 15/438,807

(22) Filed: Feb. 22, 2017

(65) Prior Publication Data

US 2017/0261199 A1 Sep. 14, 2017

(30) Foreign Application Priority Data

Mar. 14, 2016 (TW) .............................. 105107799 A
Jul. 21, 2016 (TW) .............................. 105123103 A

(51) Int. Cl.

| F21S 8/02 | (2006.01) |
| F21S 9/02 | (2006.01) |
| F21V 33/00 | (2006.01) |
| F24F 7/06 | (2006.01) |
| H02J 7/00 | (2006.01) |

(Continued)

(52) U.S. Cl.
CPC .......... *F21V 33/0096* (2013.01); *F21S 8/026* (2013.01); *F21S 9/022* (2013.01); *F24F 7/065* (2013.01); *F24F 11/89* (2018.01); *H02J 7/0068* (2013.01); *H02J 9/06* (2013.01); *H02J 9/065* (2013.01); *H05B 33/0803* (2013.01); *H05B 33/0809* (2013.01); *H05B 33/0842* (2013.01);

(Continued)

(58) Field of Classification Search
None
See application file for complete search history.

(56) References Cited

U.S. PATENT DOCUMENTS

| 7,034,506 B2 | 4/2006 | Chen et al. | |
| 2009/0298406 A1* | 12/2009 | Norbury, Jr. ............. | B60H 1/34 454/69 |
| 2016/0380461 A1* | 12/2016 | Jones ........................ | H02J 4/00 307/20 |

FOREIGN PATENT DOCUMENTS

| CN | 203641050 U | 6/2014 |
| TW | 192325 | 10/1992 |

(Continued)

*Primary Examiner* — Jared Fureman
*Assistant Examiner* — Aqeel H Bukhari
(74) *Attorney, Agent, or Firm* — Alan D. Kamrath; Mayer & Williams PC

(57) ABSTRACT

An illumination device and a ventilator include: a fan electrically connecting to a power transmitting port to be rotated for generating an airflow; a light-emitting device for transferring electrical power into illumination; a power storage module electrically connecting with the light-emitting device and the power transmitting port; and a control unit electrically connecting with the power storage module and the power transmitting port. The control unit determines whether the power transmitting port provides electrical power, the control unit controls the power storage module to store electrical power sourced from the power transmitting port when a result of the determination is positive, and the control unit controls the power storage module to output electrical power stored therein to the light-emitting device when the result of the determination is negative.

27 Claims, 5 Drawing Sheets

(51) Int. Cl.
*H02J 9/06* (2006.01)
*H05B 33/08* (2006.01)
*F24F 11/89* (2018.01)
*F21Y 115/10* (2016.01)
*F24F 7/00* (2006.01)

(52) U.S. Cl.
CPC ..... *F21Y 2115/10* (2016.08); *F24F 2007/001* (2013.01); *F24F 2221/02* (2013.01)

(56) References Cited

FOREIGN PATENT DOCUMENTS

| | | |
|---|---|---|
| TW | 200417706 A | 9/2004 |
| TW | M442414 U | 12/2012 |
| TW | M448614 U | 3/2013 |
| TW | M502810 U | 6/2015 |

\* cited by examiner

VENTILATOR WITH A LIGHT-EMITTING DEVICE

CROSS REFERENCE TO RELATED APPLICATIONS

The application claims the benefit of Taiwan application serial No. 105107799, filed on Mar. 14, 2016 and Taiwan application serial No. 105123103, filed on Jul. 21, 2016, and the entire contents of which are incorporated herein by reference.

BACKGROUND OF THE INVENTION

1. Field of the Invention

The present invention generally relates to an illumination device as well as a ventilator and, more particularly, to an illumination device or a ventilator able to provide illuminance when power failure occurs.

2. Description of the Related Art

In a bathroom or a restroom, in addition to the light-emitting device for illumination, a ventilator for enhanced ventilation is also commonly used, to expel humidity or smells in the air from the room. Therefore, it is the trend developing a combination of a ventilator and a light-emitting device for the above described purpose. A conventional equipment resulting from this idea is disclosed by Taiwanese Design Patent No. 192325, with the title of "Ventilator with Illuminative function."

Conventionally, the electrical power for a ventilator with illuminative function is directly from the electric power grid, and a user may turn on or turn off the illumination and ventilation function by switching a switch serially connected between the ventilator and the electric power grid. However, when a user tends to leave the dark bathroom or restroom urgently due to a sudden power failure in the electric power grid, the user may easily slip down or stumble over something and get hurt, which is especially dangerous to elders.

In light of this, it is necessary to provide a novel ventilator with illuminative function, which is improved for practical use during power outage.

SUMMARY OF THE INVENTION

It is therefore the objective of this invention to provide a ventilator with a light-emitting device for the light-emitting device to serve as emergency illumination when a power failure in the electric power grid occurs.

It is therefore another objective of this invention to provide a ventilator with a light-emitting device for the light-emitting device to serve as uninterruptible illumination when a power failure in the electric power grid occurs.

It is further another objective of this invention to provide an illumination device to serve as uninterruptible illumination when a power failure in the electric power grid occurs.

In an embodiment of the invention, a ventilator with a light-emitting device including a fan, a light-emitting device, a power storage module, and a control unit is shown. The fan electrically connects to a power transmitting port to be rotated for generating an airflow. The light-emitting device is for transferring electrical power into illumination. The power storage module electrically connects with the light-emitting device and the power transmitting port. The control unit electrically connects with the power storage module and the power transmitting port. The control unit performs a judgement to determine whether the power transmitting port provides electrical power, the control unit controls the power storage module to store electrical power sourced from the power transmitting port when a result of the judgement is positive, and the control unit controls the power storage module to output electrical power stored therein to the light-emitting device to transfer the electrical power into illumination when the result of the judgement is negative.

In a form shown, the ventilator with a light-emitting device further includes a power detecting circuit between the power transmitting port and the control unit, to detect a power supply status of the power transmitting port. The light-emitting device has a driving circuit and at least one emitting unit, the driving circuit electrically connects with the power detecting circuit and the at least one light emitting unit, and the at least one light emitting unit electrically connects with the power storage module. An actuating switch electrically connects the power transmitting port and the fan. Thus, the user may change the operational status of the fan by switching the actuating switch, to achieve advantages such as power saving and humidity control.

In another embodiment of the invention, a ventilator with a light-emitting device including a fan, a light-emitting device, a power storage module, and a control unit is shown. The fan electrically connects to a power transmitting port to be rotated for generating an airflow. The light-emitting device electrically connects to the power transmitting port for transferring electrical power into illumination. The power storage module electrically connects with the light-emitting device and the power transmitting port. The control unit electrically connects with the power storage module and the power transmitting port. The power transmitting port, the fan, and the light-emitting device electrically connect with a control switch, the control unit performs a judgement to determine whether the power transmitting port provides electrical power via the control switch when the control switch is turned on, the control unit controls the power storage module to store electrical power sourced from the power transmitting port when a result of the judgement is positive, and the control unit controls the power storage module to output electrical power stored therein to the light-emitting device when the result of the judgement is negative. The control unit forbids the power storage module to output electrical power when the control switch is turned off.

In a further embodiment of the invention, an illumination device including a light-emitting device, a power storage module, and a control unit is shown. The power storage module electrically connects with a power transmitting port. The control unit electrically connects with the power storage module and the power transmitting port. The power transmitting port electrically connects with a control switch, the control unit performs a judgement to determine whether the power transmitting port provides electrical power via the control switch when the control switch is turned on, the control unit controls the power storage module to store electrical power sourced from the power transmitting port when a result of the judgement is positive, and the control unit controls the power storage module to output electrical power stored therein to the light-emitting device to transfer the electrical power into illumination when the result of the judgement is negative. The control unit forbids the power storage module to output electrical power when the control switch is turned off.

In the forms shown, a power detecting circuit electrically connects the control unit and the control switch to detect a power supply status of the power transmitting port and a connection status of the control switch. The light-emitting device has a driving circuit and at least one emitting unit, the driving circuit electrically connects with the control switch, the power detecting circuit, and the at least one light emitting unit, and the at least one light emitting unit electrically connects with the power storage module. Thus, the control unit may obtain the power supply status of the power transmitting port and the connection status of the control switch, and can change the operational status of the fan by switching the control switch, to achieve advantages such as power saving and humidity control.

In the forms shown, the power storage module has at least one battery to store electrical power. The power storage module has a discharging circuit electrically connecting the battery and the control unit to discharge the battery. The control unit electrically connects with a discharging switch, the control unit performs another judgement to determine whether the discharging switch is actuated, the control unit operates the battery to release electrical power stored therein via the discharging circuit when a result of said another judgement is positive, and the control unit stops the battery from power-discharging via the discharging circuit when the result of said another judgement is negative. A discharging period is installed in the control unit, and the control unit periodically discharges the battery via the discharging circuit based on the discharging period. The power storage module has an AC/DC converting unit electrically connecting with the power transmitting port, the battery, and the control unit. The power storage module has a step-down circuit electrically connecting with the AC/DC converting unit, the battery, and the control unit. The power storage module has a step-up circuit electrically connecting with the battery, the light-emitting device, and the control unit. Thus, the control unit may obtain the power supply status of the power transmitting port to timely use the previously stored electrical power for illumination when a power failure in the electric power grid occurs. Furthermore, by discharging the battery based on the discharging period to timely release the electric power of the battery that has not been released for a long duration of time, the lifetime of related elements can be prolonged.

In the forms shown, the control unit may be a microcontroller unit or a digital signal processor. The fan is a blower fan or an axial fan. The fan and the light-emitting device are combined with a housing, and the power storage module and the control unit are arranged inside the housing. The control unit may electrically connect with a testing switch and an indicative unit, the control unit performs another judgement to determine whether the testing switch is turned on, the control unit controls the power storage module to output electrical power stored therein to the indicative unit when the result of said another judgement is positive, and the control unit stops the power storage module from outputting the electrical power to the indicative unit when the result of said another judgement is negative. Thus, the power storage module can store electrical power in advance to energize the light-emitting device when necessary, so that the light-emitting device keeps illuminating when a power failure in the electric power grid occurs, and prevents the user from slipping down or stumbling over something and getting hurt due to the dark caused by the sudden power failure.

The present disclosed illumination device and the ventilator with a light-emitting device can use the electrical power previously stored in the power storage module to operate the light-emitting device for illumination when the electrical power supplied to the power transmitting port is fails, preventing the user from getting hurt due to slipping down caused by the dark. Additionally, the provided ventilator can further expel the humid air around the power storage module by the fan, to avoid circuit corrosion thereof and to prolong the lifetime. Therefore, the present invention can still provide illumination when electrical power fails, and can also prolong the lifetime. Furthermore, the provided illumination device and ventilator are also helpful in saving medical sources since it can prevent the user from slipping down or stumbling over something and getting hurt due to the dark caused by a sudden power failure.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
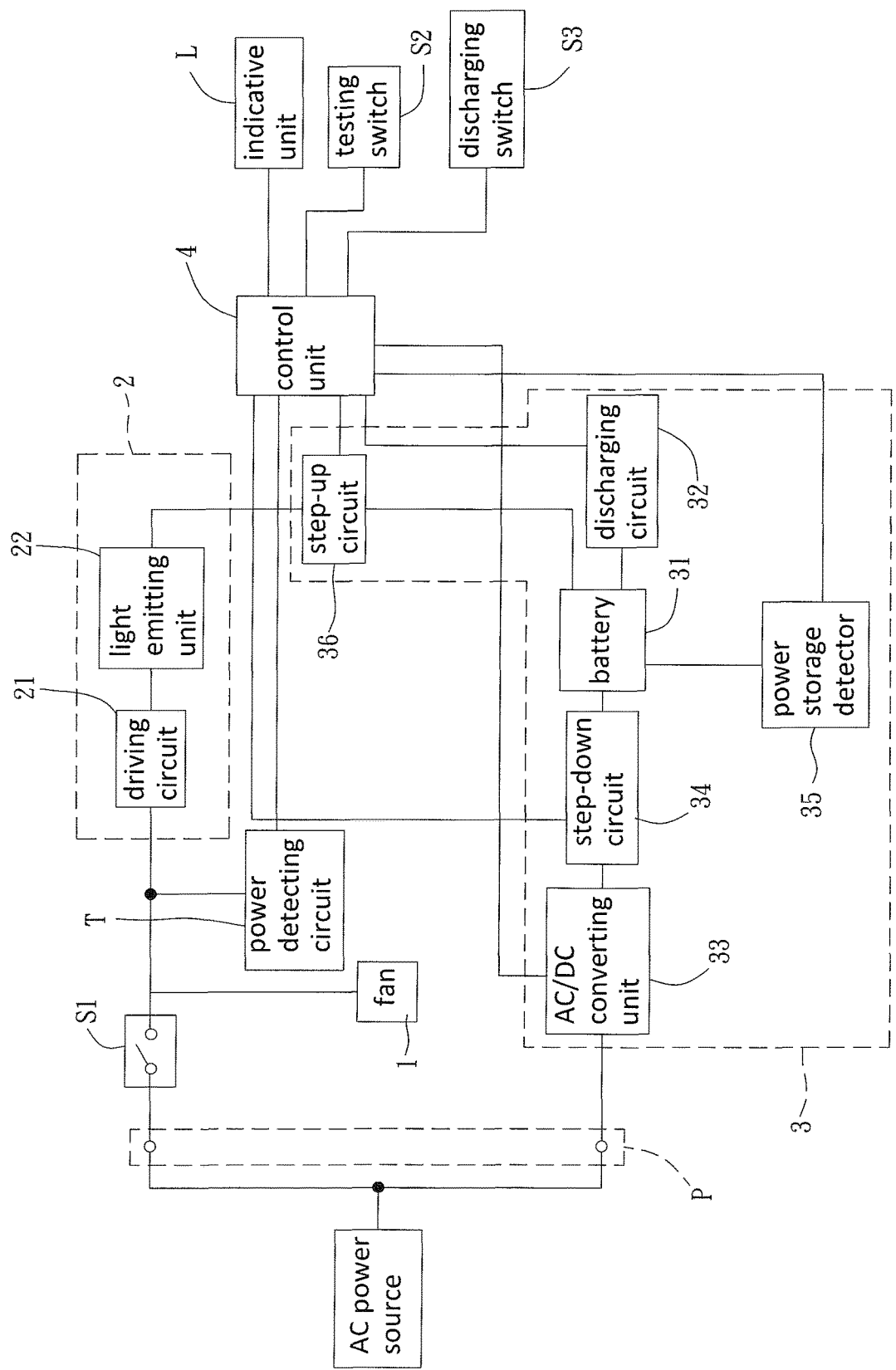
FIG. 1 shows a circuit diagram of a ventilator with a light-emitting device according to an embodiment in an uninterruptible illumination mode of the invention.

In the various figures of the drawings, the same numerals designate the same or similar parts. Furthermore, when the terms "first", "second", "inner" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The term "isolating member" referred in the following is defined as a divider able to separate a space into two parts. For example, referring to FIGS. 2 and 3, when a ceiling board of a room serves as the isolating member with a reference character of D, the inner space of the room is separated into a part beneath the ceiling board and another part above the ceiling board but below the floor board.

The term "power transmitting port" referred in the following is defined as an electrical joint of electronic devices, such as a plug, a pin or a wire, to electrically connect with an external power source for an electrical power supply. Specifically, said power transmitting port does not include the electrical joint of the external power source, such as the socket for the plug of an electronic device to couple with.

Please refer to FIG. 1 now, which shows a circuit diagram of a ventilator with a light-emitting device of a first embodiment of the present invention, and said circuit diagram is adapted to work in an uninterruptible illumination mode. In this embodiment, the ventilator with a light-emitting device may include a fan 1, a light-emitting device 2, a power storage module 3, and a control unit 4. The fan 1 may connect to a power transmitting port P, so that the fan 1 can be rotated and generate an airflow when the power transmitting port P electrically connects with an external power source. The light-emitting device 2 is adapted to transfer the received electrical power into illumination, and it is preferable that the light-emitting device 2 directly connects with the power transmitting port P in this uninterruptible illumination mode. The power storage module 3 electrically connects with the light-emitting device 2 and the power transmitting port P for storing electrical power received from the power transmitting port P and for outputting electrical power to the light-emitting device 2. The control unit 4 may electrically connect with the power storage module 3 and the power transmitting port P for controlling the power supplied to the light-emitting device 2.

Figure 4:
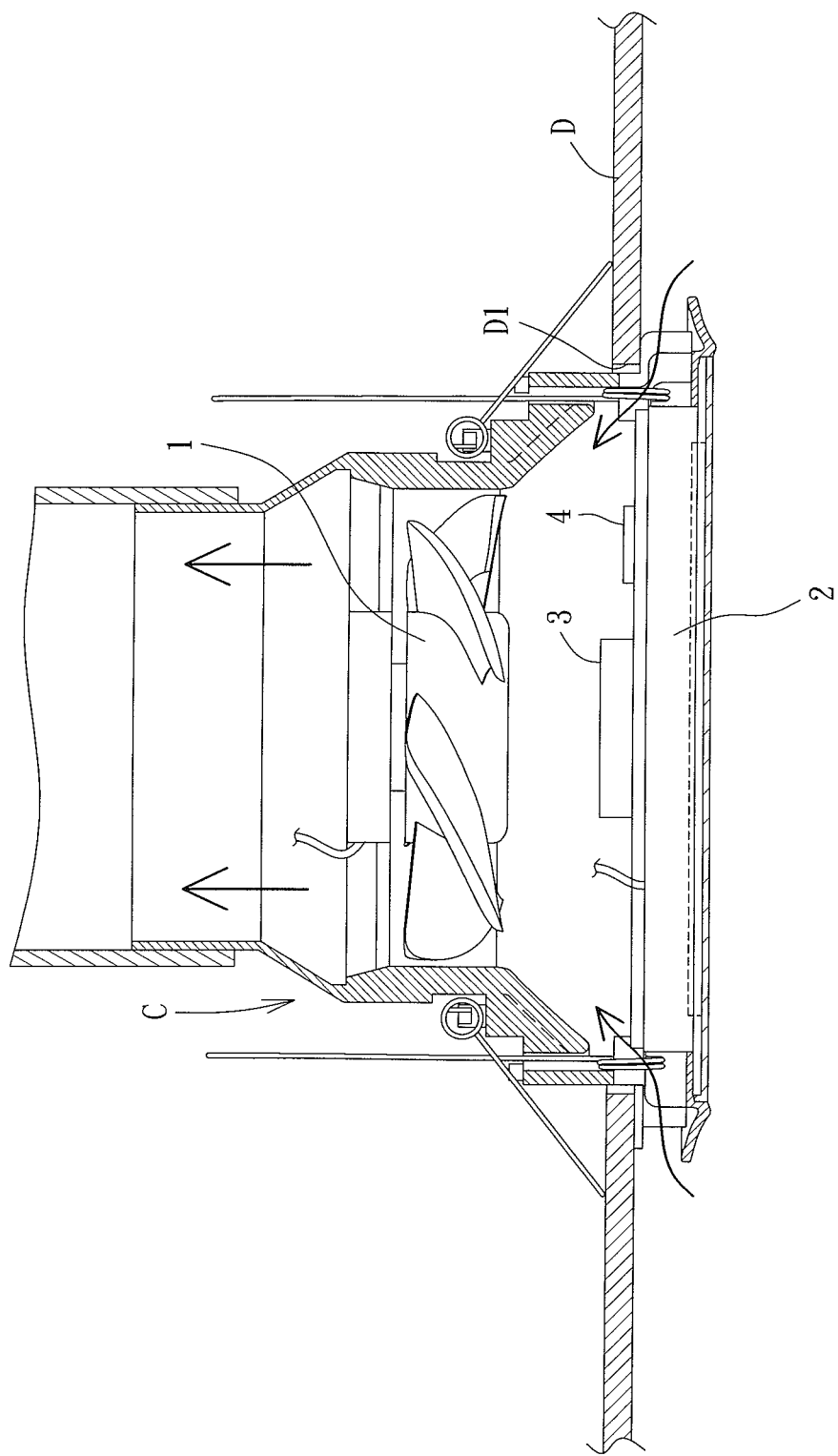
FIG. 4 shows a sectional side view of a ventilator with a light-emitting device according to an embodiment of the invention.
Figure 5:
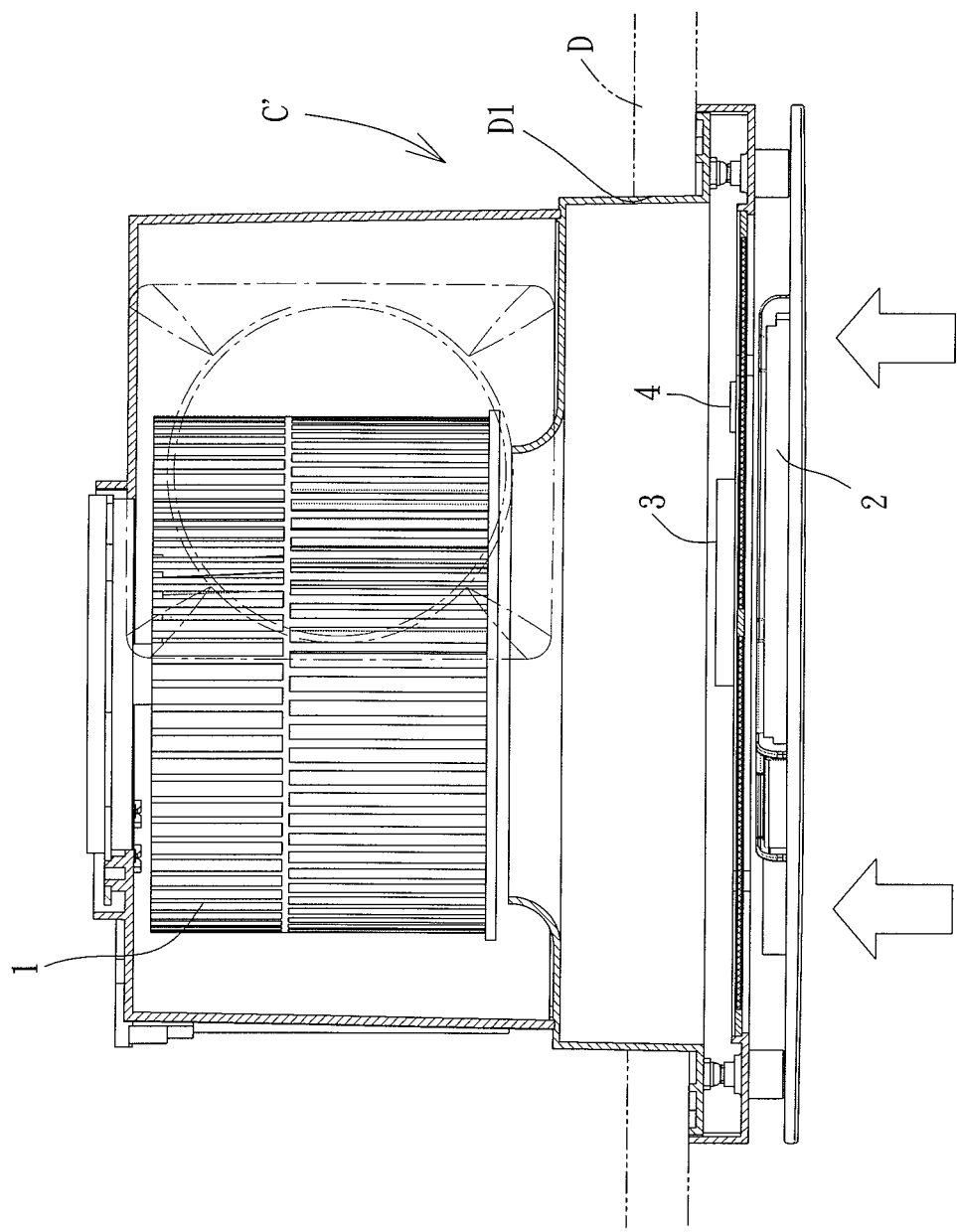
FIG. 5 shows a sectional side view of a ventilator with a light-emitting device according to another embodiment of the invention.

Specifically, the fan 1 can be an axial fan as shown in FIG. 4 or a blower fan as shown in FIG. 5. The fan 1 may include a DC motor or an AC motor as the electrically driven part of the fan 1 when turning to generate the airflow.

Furthermore, referring to FIG. 1 again, the light-emitting device 2 may include a driving circuit 21 (such as a LED driving circuit with a rectification function) and at least one light emitting unit 22 (such as a LED module). The driving circuit 21 serially connects with and between the power transmitting port P and the at least one light emitting unit 22, and the driving circuit 21 is adapted to generate an electrical signal for activating the at least one light emitting unit 22.

Moreover, the power storage module 3 may include at least one battery 31 and a discharging circuit 32. The at least one battery 31 may electrically connect with the power transmitting port P to store the electrical power received from the power transmitting port P and to provide the stored electrical power to the light-emitting device 2. The discharging circuit 32 (such as a bypass circuit) serially connects with and between the battery 31 (such as a NiCd battery or a NiMH battery) and the control unit 4. The discharging circuit 32 is adapted for discharging the battery 31 to prevent the battery 31 from damage caused by the fact that the electric power of the battery 31 has not been released for a long duration of time, thus prolongs the lifetime of the battery 31 and also maintains the charging/discharging property thereof. The power storage module 3 may also include an AC/DC converting unit 33, a step-down circuit 34, and a power storage detector 35. The AC/DC converting unit 33, such as a power supply with multi-DC-outputs, may electrically connect with the power transmitting port P, the battery 31, and the control unit 4 to convert the AC power from the power transmitting port P into DC power and then store in the battery 31. Furthermore, the AC/DC converting unit 33 may also electrically connect to and supply power to the fan 1. The step-down circuit 34, such as a buck charger circuit, may electrically connect with the AC/DC converting unit 33, the battery 31, and the control unit 4. Therefore, the control unit 4 can control the step-down circuit 34 to drop the DC power outputted by the AC/DC converting unit 33 to a voltage level acceptable to the battery 31, so that the battery 31 can save the voltage-dropped DC power. The power storage detector 35 may electrically connect with the battery 31 and the control unit 4 for the control unit 4 to monitor the saved power in the battery 31. The power storage module 3 may further include a step-up circuit 36, such as a boost driving circuit, electrically connecting with the battery 31, the light emitting unit 22 of the light-emitting device 2, and the control unit 4. The step-up circuit 36 may boost the voltage of the outputted power of the battery 31 according to a signal generated by the control unit 4, and the voltage-boosted DC power can be supplied to the light emitting unit 22. However, the object to receive the voltage-boosted DC power from the step-up circuit 36 is not thus limited.

Moreover, the control unit 4 may be implemented by a computing element such as microcontroller unit (MCU) or digital signal processor (DSP). There can be a control program installed in the control unit 4 while the control unit 4 stores required data as well, so that the control unit 4 may control the electricity supply to the light-emitting device 2.

Figure 2:
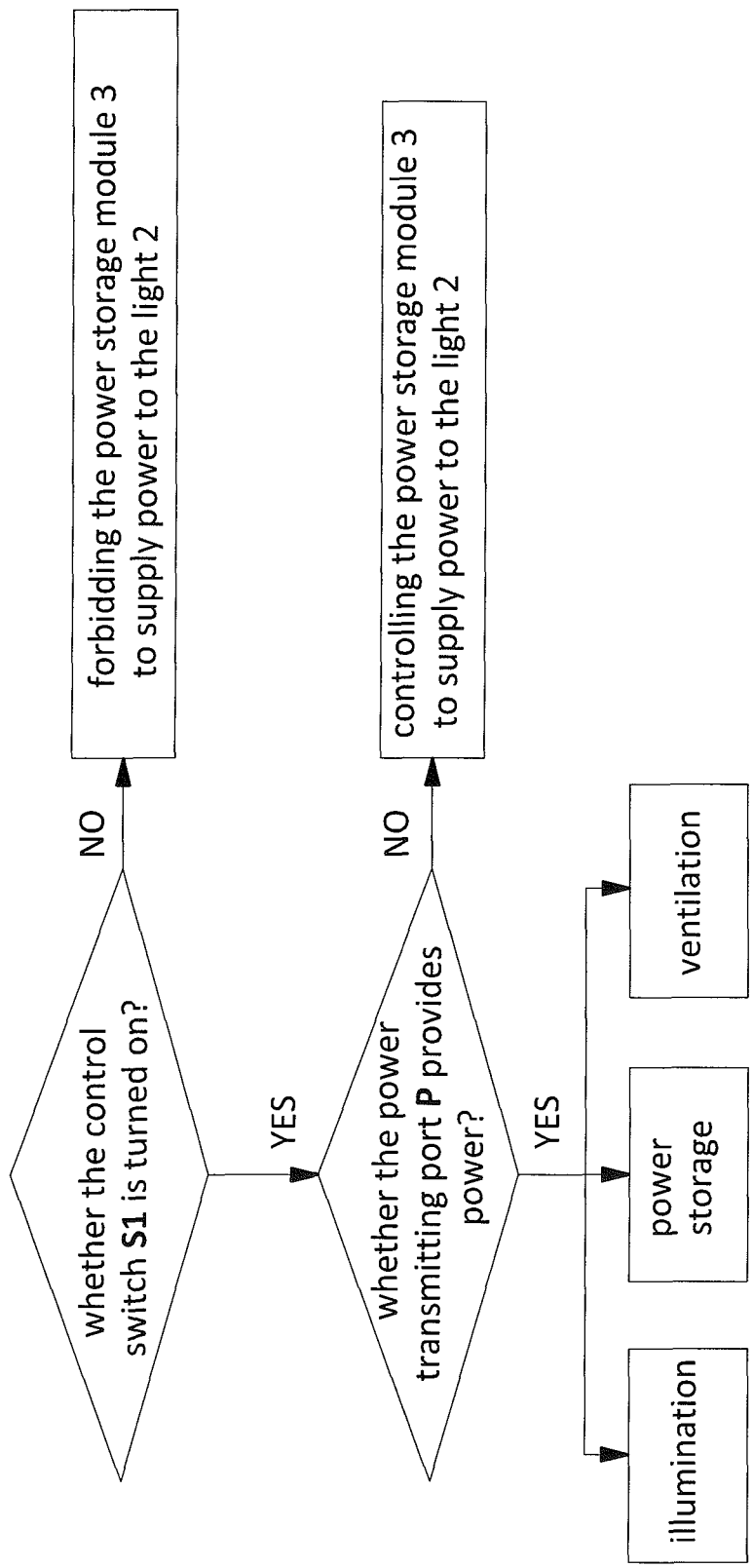
FIG. 2 shows a flow chart of a ventilator with a light-emitting device according to the embodiment in the uninterruptible emergency illumination mode of the invention.

In the uninterruptible illumination mode shown in FIG. 1, there is a control switch S1, such as a wall control switch, electrically connecting with the power transmitting port P, the fan 1, and the light-emitting device 2, and a power detecting circuit T, such as a voltage detector, a current detector, or a resistance detector is electrically connected with the control unit 4 and the control switch S1. Specifically, the light-emitting device 2 is directly connected with the power transmitting port P in this mode. Therefore, the control unit 4 can acquire the power supply status of the power transmitting port P and the connection status of the control switch. S1. For example but not thus limited, the connection status of the control switch S1 can be obtained by resistance detection, and the power supply status of the power transmitting port P can be obtained by voltage or current detection. Referring to FIG. 2, if the power transmitting port P provides electrical power normally and if the control switch S1 is turned on, the fan 1 and the light-emitting device 2 are electrically energized by the power transmitting port P, thus the ventilation and illumination purposes are satisfied. Under the above situation, the control unit 4 continuously monitors whether the power transmitting port P keeps providing electrical power. As long as the power transmitting port P keeps providing electrical power, so that the electric power grid works well, the control unit 4 may control the power storage module 3 to store the electrical power from the power transmitting port P in addition to maintain the ventilation and illumination functions via the fan 1 and the light-emitting device 2. For example, the control unit 4 may enable the step-down circuit 34 of the power storage module 3 for power storage. However, once the control unit 4 detects that the power transmitting port P stops providing electrical power, which means that a power failure in the electric power grid occurs, the control unit 4 controls the power storage module 3 to supply stored power to the light-emitting device 2 immediately. Therefore, although both of the fan 1 and light-emitting device 2 cannot obtain power from the power transmitting port P, the light-emitting device 2 can still provide the illumination without any interruption. Furthermore, despite what the status of the power transmitting port P is, the control unit 4 may forbid the power storage module 3 outputting electrical power to the light-emitting device 2 if the control switch S1 is turned off. For example, the control unit 4 may disable the step-up circuit 36 to break the power supply from the power storage module 3 to the light-emitting device 2. Accordingly, with the control over the control switch S1 changing the operations of the fan 1 and light-emitting device 2, purposes such as uninterruptable illumination, energy saving, and humidity expelling are achieved.

Figure 3:
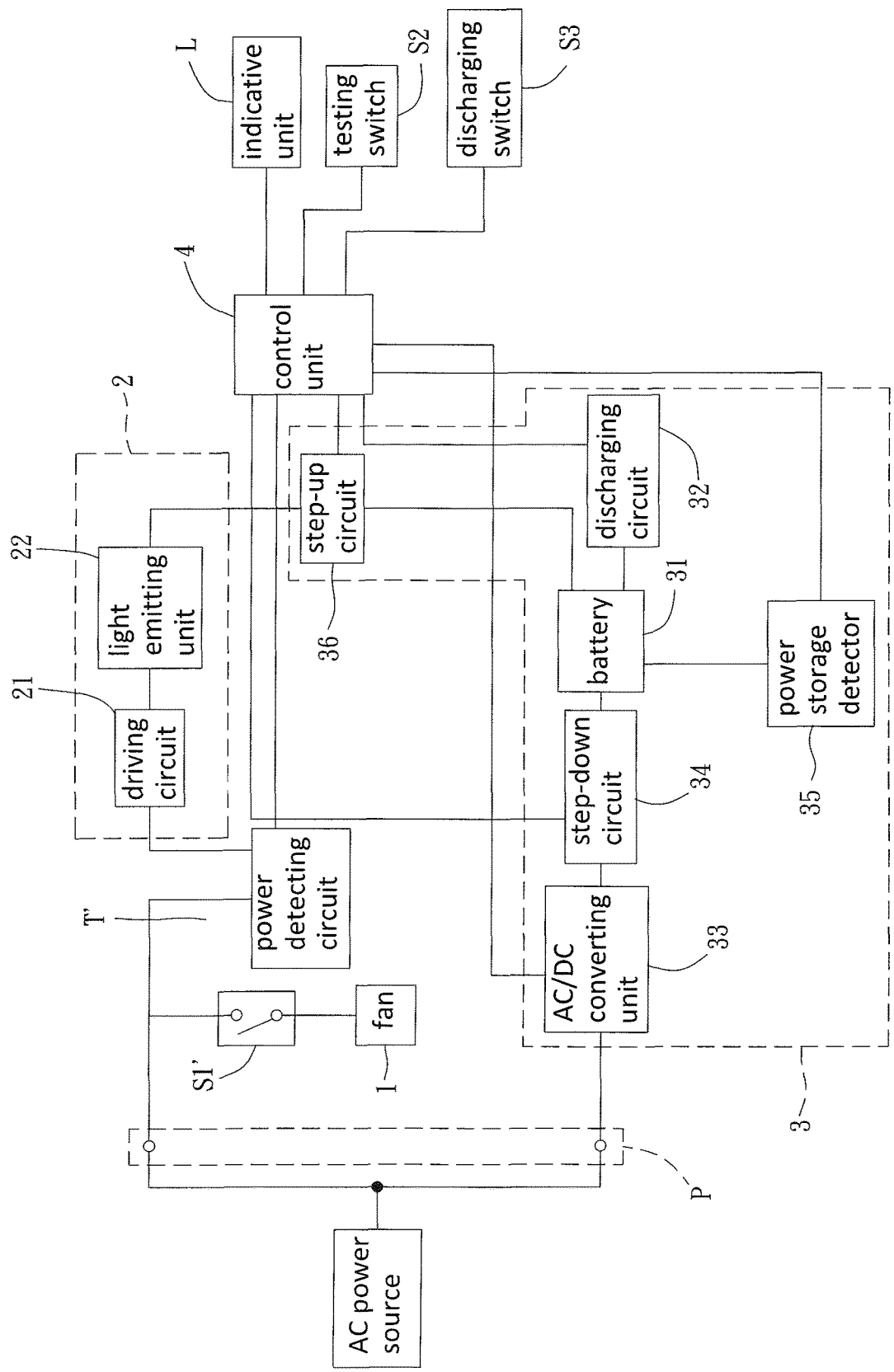
FIG. 3 shows a circuit diagram of the ventilator with a light-emitting device according to the embodiment in an emergency illumination mode of the invention.

In addition to the above illustrated first embodiment adapted to work in the uninterruptible illumination mode, there is a second embodiment of the present invention, working in an emergency illumination mode. A circuit diagram of a ventilator with a light-emitting device of the second embodiment is shown in FIG. 3. In comparison with the electrical structure disclosed in the first embodiment, the light-emitting device 2 is not directly connected to the power transmitting port P in this emergency illumination mode. Moreover, instead of the control switch S1 connecting with the light-emitting device 2, an actuating switch S1' is electrically connecting with the power transmitting port P and the fan 1 for controlling the operation of the fan 1, as well as a power detecting circuit T' is arranged between the power transmitting port P and the control unit 4 to replace the power detecting circuit T connecting with the control unit 4 and the control switch S1. The above power detecting circuit T' can output a logic signal according to the power supply status of the power transmitting port P.

For example, the logic signal generated by the power detecting circuit T' can be at a low voltage level representing "logic low" when the power transmitting port P keeps providing electrical power. Alternatively, said logic signal can be at a high voltage level representing "logic high" when the power transmitting port P stops providing electrical power. The light-emitting device 2, which does not directly connect with the power transmitting port P, electrically connects with the power detecting circuit T' and the power storage module 3. The connections of the light-emitting device 2, the power storage module 3, and the control unit 4 of this embodiment working in the emergency illumination mode are similar to those of the first embodiment working in the uninterruptible illumination mode.

Particularly, the control unit 4 of this second embodiment is able to determine whether the power transmitting port P normally provides electrical power. If the result of the determination is positive, the control unit 4 may control the power storage module 3 to store electrical power sourced from the power transmitting port P. For example, the control unit 4 can output an enable signal to the step-down circuit 34 for providing electrical power with a voltage level acceptable to the battery 31, to recharge the battery 31. Under this situation, the light-emitting device 2 does not emit illumination, and the fan 1 can operate according to the connection status of the actuating switch S1'. Alternatively, if the result of the determination is negative, the control unit 4 may control the power storage module 3 to output the stored electrical power to the light-emitting device 2. For example, the control unit 4 may output another enable signal to the step-up circuit 36, so that the step-up circuit 36 can transfer the electrical power provided by the battery 31 into a regular format suitable to the light emitting unit 22. Thus, when the power transmitting port P fails to provide the electrical power, the light-emitting device 2 can keep working as an emergency illumination by using the electrical power previously stored in the power storage module 3. Accordingly, slips or stumbles due to the dark environment can be surely avoided.

Furthermore, referring to both FIGS. 1 and 3, in each embodiment, the control unit 4 may further electrically connect with a testing switch S2 and an indicative unit L, such as a LED (light emitting diode) or a LCD (liquid crystal displayer). The control unit 4 may determine whether the testing switch S2 is turned on or not. If the result of the determination is positive, the control unit 4 can control the power storage module 3 to output the stored electrical power to the indicative unit L for showing whether the battery 31 is charged or not. However, the control unit 4 may also control the power storage module 3 to output the stored electrical power to the light-emitting device 2, to test whether the light-emitting device 2 functions well. On the other hand, if the result of the determination is negative, the control unit 4 stops the power storage module 3 from outputting the electrical power to the indicative unit L. Accordingly, with the testing switch S2 and the indicative unit L, the user can easily know the quantity of the stored electrical power within the battery 31 and thus can make sure that the stored electrical power is enough for operating the light-emitting device 2 timely.

In both of the first and second embodiments, as shown in FIGS. 1 and 3, the control unit 4 can further connect with a discharging switch S3 for the user to empty the stored electrical power in the battery 31. In operation, the control unit 4 determines whether the discharging switch S3 is actuated or not according to information such as the output voltage level of the discharging switch S3. If the result of the determination is positive, the control unit 4 can operate the battery 31 of the power storage module 3 to release the stored electrical power via the discharging circuit 32, such as sending an enable signal to the discharging circuit 32 for emptying the battery 31 and thus for prolonging the lifetime thereof. On the other hand, if the result of the determination is negative, the control unit 4 may output another signal such as a disable signal to the discharging circuit 32 for stopping the power storage module 3 from power-discharging via the discharging circuit 32. The power-discharging function described above may also be performed by the control unit 4 automatically and periodically with a discharging period installed in the control unit 4, such as thirty days for example. Accordingly, the control unit 4 can periodically discharge the battery 31 of the power storage module 3 via the discharging circuit 32. One way to realize said auto-discharging function for the battery 31 is setting a timer in the control unit 4, and the control unit 4 enables the discharging circuit 32 fora while as well as resets the count-down value of the timer back to a number representing the discharging period. Moreover, as shown in FIGS. 1 and 3, the control unit 4 may further show the source of the electrical power provided to the fan 1 and the light-emitting device 2 via the indicative unit L. The indicative unit L is able to show the information of said source can be implemented by a LCD but is not thus limited.

Please refer to FIGS. 4 and 5. In assembly of the embodiments of the present disclosure invention, the fan I and the light-emitting device 2 can be combined as a whole by a housing, such as the housing C in FIG. 4 or the housing C' in FIG. 5. Each of the housings C, C' can either couple with the frame of the fan 1 or serve as the frame of the fan 1. With the housing C or C', for combination of the fan 1 and the light-emitting device 2, there can be an air channel inside the housing C or C', and the light-emitting device 2 is arranged in the air channel. Furthermore, the locations of the power storage module 3 and the control unit 4 are not limited to be inside or outside the housing C or C'.

In practical use of the embodiments of the present invention, the housing C or C' can be settled in a through hole D1 of a divider D, such as the assembly hole of a ceiling board in a bathroom or a restroom. The power transmitting port P electrically connects with an AC power source such as the electric power grid or an electric generator, so that the disclosed ventilator can fulfill the illumination and ventilation requirement in the bathroom or the restroom. With the presented ventilator normally operating for illumination or ventilation, the tight-emitting device 2 supplied with the electrical power previously stored in the power storage module 3 can keep working when the AC power source suddenly fails. Thus, the user can avoid getting hurt due to slipping down caused by the dark.

Please refer to FIGS. 4 and 5 again. Operation of the fan 1 can efficiently enhance the airflow around the power storage module 3. Thus, damages to the power storage module 3 due to the humid air in the bathroom or restroom, which may lead to circuit corrosion or even short circuits, can be avoided easily. Therefore, the possibility in damage can be lowered to prolong the lifetime of the ventilator.

Moreover, as shown in FIG. 1, the first embodiment of the ventilator with a light-emitting device, adapted to work in the uninterruptible illumination mode, can be modified to become an illumination device without the fan 1 and is still able to work in the uninterruptible illumination mode. Specifically, the illumination device may include the light-emitting device 2, the power storage module 3, and the control unit 4. The light-emitting device 2 may electrically connect with the power transmitting port P, such as electrically connecting with the power transmitting port P via the control switch S1 to transfer electrical power into illumination. The power storage module 3 may electrically connect with the power transmitting port P and the light-emitting device 2, to store electrical power inputted from the power transmitting port P and to electrically energize the light-emitting device 2. The control unit 4 may electrically connect with the power storage module 3 and the power transmitting port P, as well as the power transmitting port P and the light-emitting device 2 may electrically connect with the control switch S1. Accordingly, if the control switch S1 is turned on, the control unit 4 may perform a judgement to determine whether the power transmitting port P normally provides electrical power via the control switch S1. If the result of the judgement is positive, the control unit 4 controls the power storage module 3 to store electrical power sourced from the power transmitting port P. Alternatively, if the result of the judgement is negative, the control unit 4 may control the power storage module 3 to output the stored electrical power to the light-emitting device 2, to transfer the electrical power into illumination. On the other hand, when the control switch S1 is turned off, the control unit 4 may forbid the power storage module 3 to output electrical power. Thus, the light-emitting device 2 may be electrically energized by the power transmitting port P or the power storage module 3 when the control switch S1 is turned on, to transfer the electrical power into illumination. The way to practically use the above illustrated illumination device is similar to that for the previous embodiments and thus is not illustrated further.

In summary, the embodiments of the present disclosed illumination device and the ventilator with a light-emitting device can use the electrical power previously stored in the power storage module 3 to operate the light-emitting device 2 for illumination when the electrical power supplied to the power transmitting port P fails, preventing the user from getting hurt due to slipping down caused by the dark. Additionally, the ventilator with a light-emitting device can further expel the humid air around the light-emitting device 2, the power storage module 3 and the control unit 4 by the fan 1, to avoid circuit corrosion thereof. Therefore, the embodiments of the present invention can still provide illumination when electrical power fails, and can also prolong the lifetime of the light-emitting device. Furthermore, the provided illumination device and ventilator are also helpful in saving medical sources since it can prevent the user from slipping down or stumbling over something and getting hurt due to the dark caused by a sudden power failure.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A ventilator comprising:
a fan electrically connecting to a power transmitting port to be rotated for generating an airflow, wherein the fan is a blower fan or an axial fan;
a light-emitting device for transferring electrical power into illumination;
a power storage module electrically connecting with the light-emitting device and the power transmitting port; and
a control unit electrically connecting with the power storage module and the power transmitting port, wherein the control unit performs a judgement to determine whether the power transmitting port provides electrical power, wherein the control unit controls the power storage module to store electrical power sourced from the power transmitting port when a result of the judgement is positive, wherein the control unit controls the power storage module to output electrical power stored therein to the light-emitting device to transfer the electrical power into illumination when the result of the judgement is negative, and wherein the power storage module does not output the electrical power stored therein to the fan when the result of the judgment is negative.

2. The ventilator as claimed in claim 1, wherein a power detecting circuit electrically connects the power transmitting port and the control unit to detect a power supply status of the power transmitting port.

3. The ventilator as claimed in claim 2, wherein the light-emitting device has a driving circuit and at least one light emitting unit, wherein the driving circuit electrically connects with the power detecting circuit and the at least one light emitting unit, and wherein the at least one light emitting unit electrically connects with the power storage module.

4. The ventilator as claimed in claim 1, wherein an actuating switch electrically connects the power transmitting port and the fan.

5. The ventilator as claimed in claim 1, wherein the power storage module has at least one battery to store electrical power.

6. The ventilator as claimed in claim 5, wherein the power storage module has a discharging circuit electrically connecting the battery and the control unit to discharge the battery.

7. The ventilator as claimed in claim 6, wherein the control unit electrically connects with a discharging switch, wherein the control unit performs another judgement to determine whether the discharging switch is actuated, wherein the control unit operates the battery to release electrical power stored therein via the discharging circuit when a result of said another judgement is positive, and wherein the control unit stops the battery form power-discharging via the discharging circuit when the result of said another judgement is negative.

8. The ventilator as claimed in claim 6, wherein a discharging period is installed in the control unit, and wherein the control unit periodically discharges the battery via the discharging circuit based on the discharging period.

9. The ventilator as claimed in claim 5, wherein the power storage module has an AC/DC converting unit electrically connecting with the power transmitting port, the battery, and the control unit.

10. The ventilator as claimed in claim 9, wherein the power storage module has a step-down circuit electrically connecting with the AC/DC converting unit, the battery, and the control unit.

11. The ventilator as claimed in claim 5, wherein the power storage module has a step-up circuit electrically connecting with the battery, the light-emitting device, and the control unit.

12. The ventilator as claimed in claim 1, wherein the control unit is a microcontroller unit or a digital signal processor.

13. The ventilator as claimed in claim 1, wherein the fan and the light-emitting device are combined with a housing, and wherein the power storage module and the control unit are arranged inside the housing.

14. The ventilator as claimed in claim 1, wherein the control unit electrically connects with a testing switch and an indicative unit, wherein the control unit performs another judgement to determine whether the testing switch is turned on, wherein the control unit controls the power storage module to output electrical power stored therein to the indicative unit when the result of said another judgement is positive, and wherein the control unit stops the power storage module from outputting the electrical power to the indicative unit when the result of said another judgement is negative.

15. A ventilator comprising:
a fan electrically connecting to a power transmitting port to be rotated for generating an airflow, wherein the fan is a blower fan or an axial fan;
a light-emitting device electrically connecting to the power transmitting port for transferring electrical power into illumination;
a power storage module electrically connecting with the light-emitting device and the power transmitting port; and
a control unit electrically connecting with the power storage module and the power transmitting port, wherein the power transmitting port, the fan, and the light-emitting device electrically connect with a control switch, wherein the control unit performs a judgement to determine whether the power transmitting port provides electrical power via the control switch when the control switch is turned on, wherein the control unit controls the power storage module to store electrical power sourced from the power transmitting port when a result of the judgement is positive, wherein the control unit controls the power storage module to output electrical power stored therein to the light-emitting device when the result of the judgement is negative, wherein the control unit forbids the power storage module to output electrical power when the control switch is turned off, and wherein the power storage module does not output the electrical power stored therein to the fan when the result of the judgment is negative.

16. The ventilator as claimed in claim 15, wherein a power detecting circuit electrically connects the control unit and the control switch to detect a power supply status of the power transmitting port and a connection status of the control switch.

17. The ventilator as claimed in claim 16, wherein the light-emitting device has a driving circuit and at least one light emitting unit, wherein the driving circuit electrically connects with the control switch, the power detecting circuit, and the at least one light emitting unit, and wherein the at least one light emitting unit electrically connects with the power storage module.

18. The ventilator as claimed in claim 15, wherein the power storage module has at least one battery to store electrical power.

19. The ventilator as claimed in claim 18, wherein the power storage module has a discharging circuit electrically connecting the battery and the control unit to discharge the battery.

20. The ventilator as claimed in claim 19, wherein the control unit electrically connects with a discharging switch, wherein the control unit performs another judgement to determine whether the discharging switch is actuated, wherein the control unit operates the battery to release electrical power stored therein via the discharging circuit when a result of said another judgement is positive, and wherein the control unit stops the battery from power-discharging via the discharging circuit when the result of said another judgement is negative.

21. The ventilator as claimed in claim 19, wherein a discharging period is installed in the control unit, and wherein the control unit periodically discharges the battery via the discharging circuit based on the discharging period.

22. The ventilator as claimed in claim 18, wherein the power storage module has an AC/DC converting unit electrically connecting with the power transmitting port, the battery, and the control unit.

23. The ventilator as claimed in claim 22, wherein the power storage module has a step-down circuit electrically connecting with the AC/DC converting unit, the battery, and the control unit.

24. The ventilator as claimed in claim 18, wherein the power storage module has a step-up circuit electrically connecting with the battery, the light-emitting device, and the control unit.

25. The ventilator as claimed in claim 15, wherein the control unit is a microcontroller unit or a digital signal processor.

26. The ventilator as claimed in claim 15, wherein the fan and the light-emitting device are combined with a housing, and wherein the power storage module and the control unit are arranged inside the housing.

27. The ventilator as claimed in claim 15, wherein the control unit electrically connects with a testing switch and an indicative unit, wherein the control unit performs another judgement to determine whether the testing switch is turned on, wherein the control unit controls the power storage module to output electrical power stored therein to the indicative unit when the result of said another judgement is positive, and wherein the control unit stops the power storage module from outputting the electrical power to the indicative unit when the result of said another judgement is negative.

* * * * *